United States Patent [19]

Boykin

[11] Patent Number: 4,614,058

[45] Date of Patent: Sep. 30, 1986

[54] PROTECTIVE SYSTEM FOR VAN AND TRUCK VENT WINDOWS

[76] Inventor: Richard C. Boykin, 245 7th Ave., New York, N.Y. 10001

[21] Appl. No.: 747,960

[22] Filed: Jun. 24, 1985

[51] Int. Cl.[4] .............................................. E06B 3/68
[52] U.S. Cl. ......................................... 49/56; 49/391; 292/DIG. 6; 160/DIG. 2
[58] Field of Search ................. 49/56, 57, 54, 50, 391, 49/63, 144, 145; 292/DIG. 6; 160/DIG. 2; 98/2.12

[56] References Cited

U.S. PATENT DOCUMENTS

| | | | |
|---|---|---|---|
| 2,019,127 | 10/1935 | Flynn et al. | 160/DIG. 2 |
| 2,098,174 | 11/1937 | Giberson | 160/DIG. 2 |
| 2,139,156 | 12/1938 | Gill | 49/57 |
| 2,528,786 | 11/1950 | Roberts | 160/DIG. 2 |
| 2,585,118 | 2/1952 | Hansen | 160/DIG. 2 |
| 2,757,725 | 8/1956 | Kulisch | 49/57 |
| 2,864,648 | 12/1958 | Bland | 49/57 |
| 3,722,935 | 3/1973 | Latib | 292/DIG. 6 |
| 4,124,239 | 11/1978 | Horton | 292/DIG. 6 |
| 4,130,309 | 12/1978 | Lewis | 292/DIG. 6 |

FOREIGN PATENT DOCUMENTS

| | | | |
|---|---|---|---|
| 498566 | 9/1954 | Italy | 49/56 |
| 1231678 | 5/1971 | United Kingdom | 292/DIG. 6 |

Primary Examiner—William E. Lyddane
Assistant Examiner—Gerald A. Anderson

[57] ABSTRACT

A protective system for the vent window of a motor vehicle that comprises a metal mesh member positioned across the vent window inside the vehicle. A blocking pin connected to the mesh member extends laterally at a location that blocks rotational movement of the vent window latch from a locked mode onto the adjacent door frame wherein the vent window is prevented from being rotated from its closed position to an open position. The mesh member has a frame that includes a forward angled frame portion and a horizontal bottom frame portion that are adapted to secure the mesh member to the front door. A plate is secured to the front door via window regulator plate screws. A hinge secured to the plate and the bottom frame portion is adapted to rotate the mesh member about a horizontal axis to a position away from the vent window. A mounting bar having a slidable member is secured to the front door via vent window frame screws. The slidable member secures or frees pins attached to the mesh frame for transverse movement of the mesh member about the hinge.

16 Claims, 19 Drawing Figures

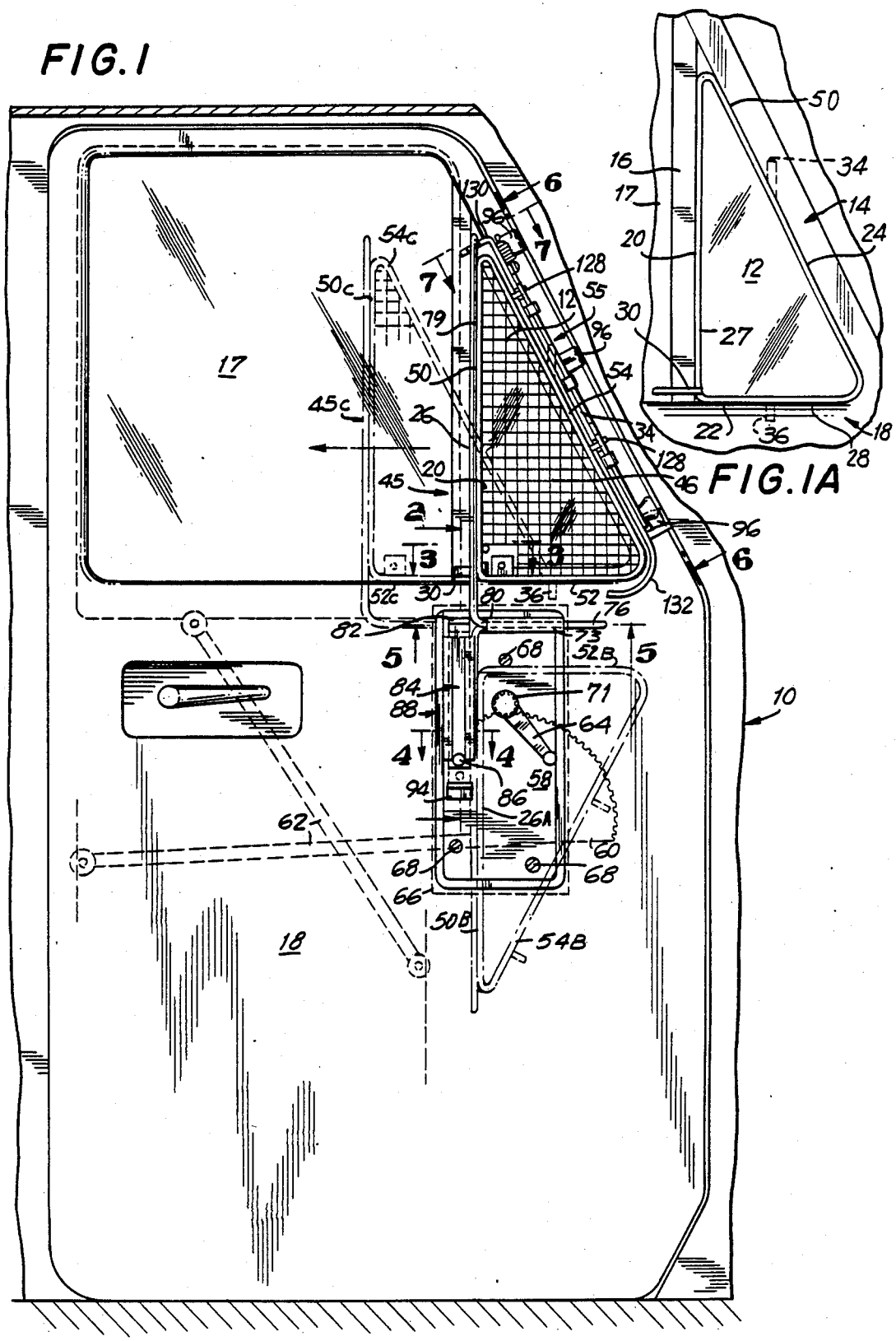

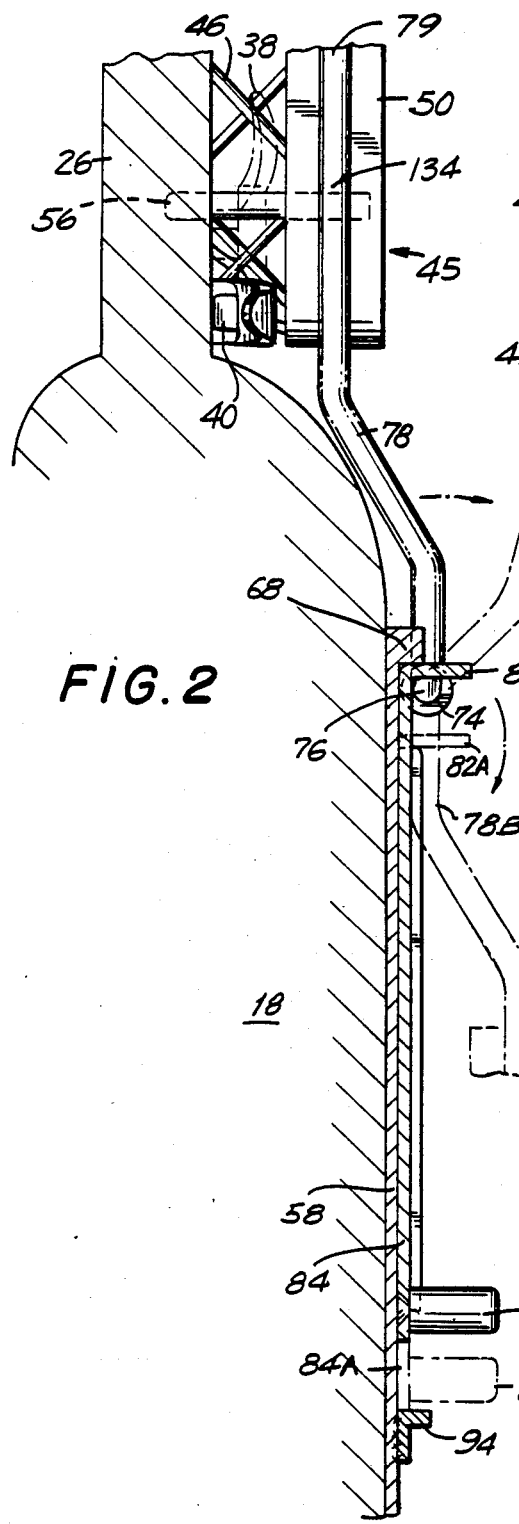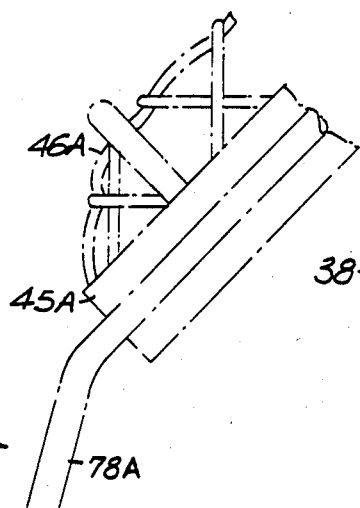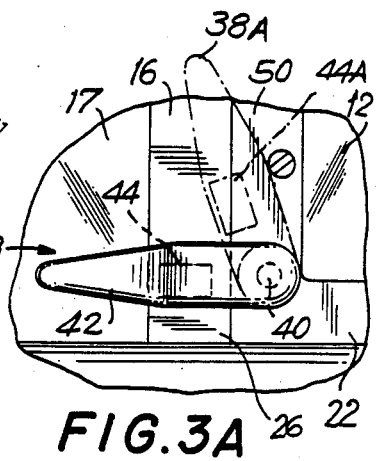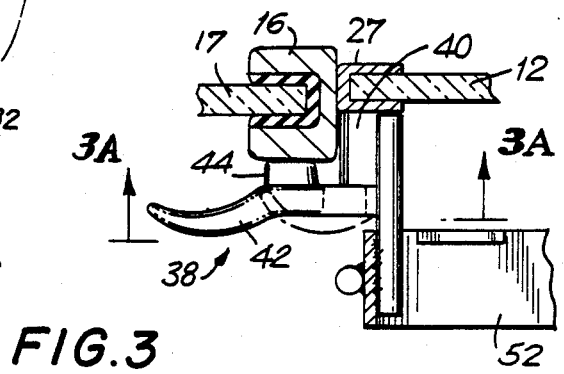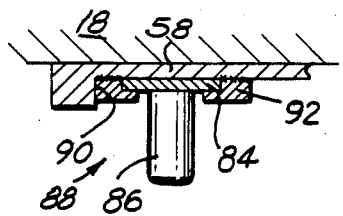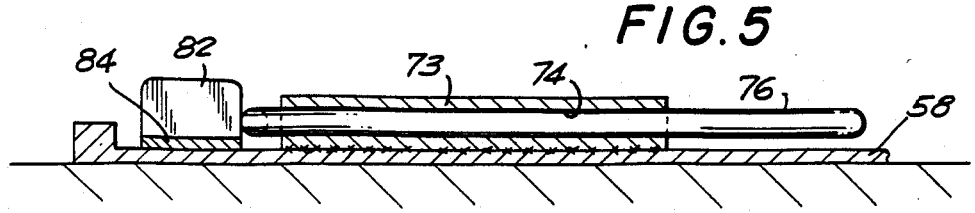

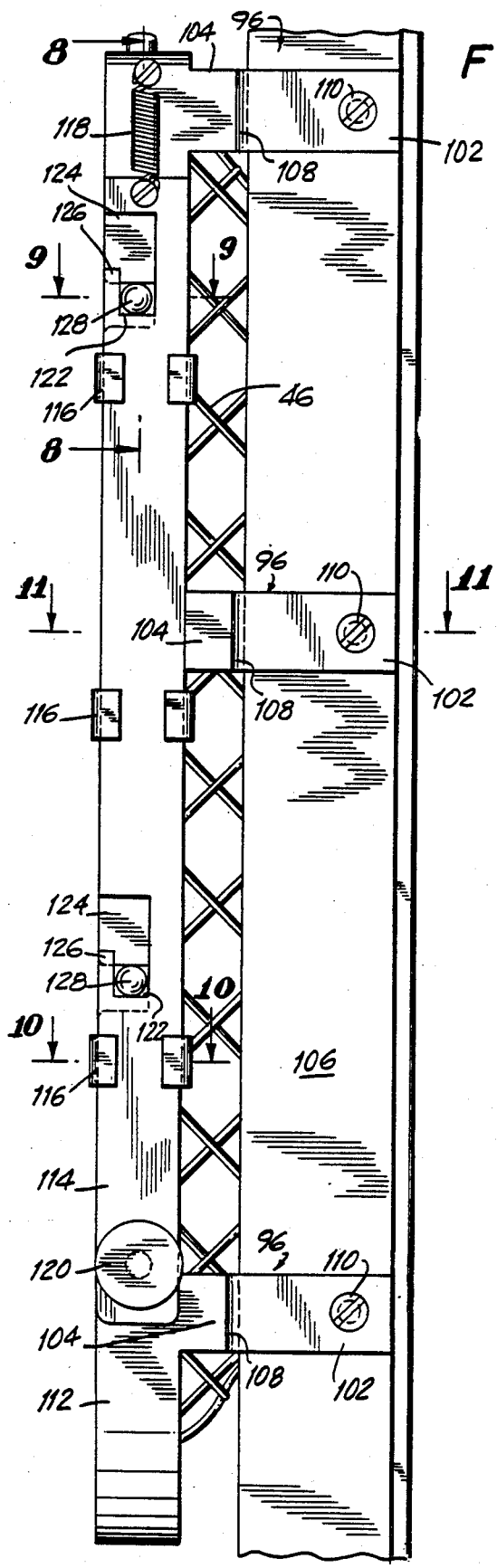
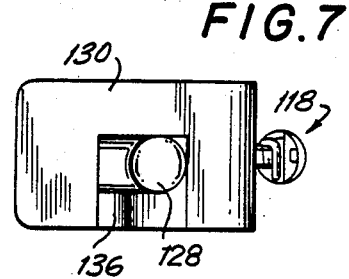
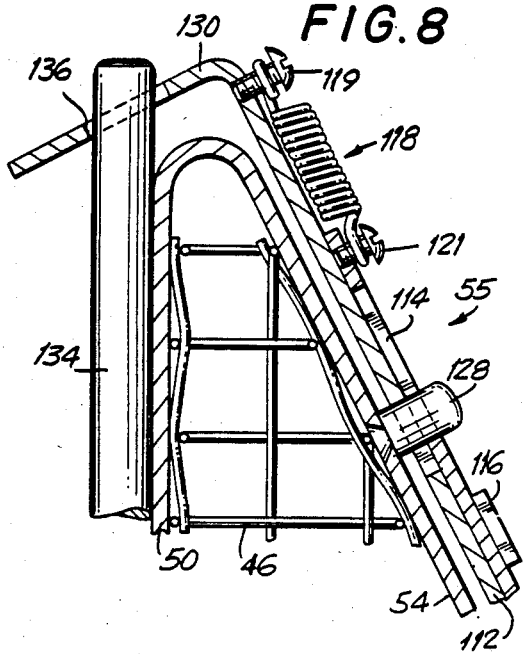
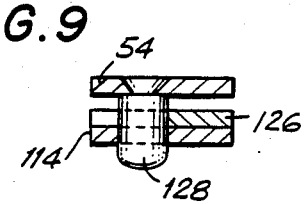
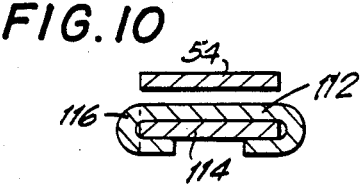

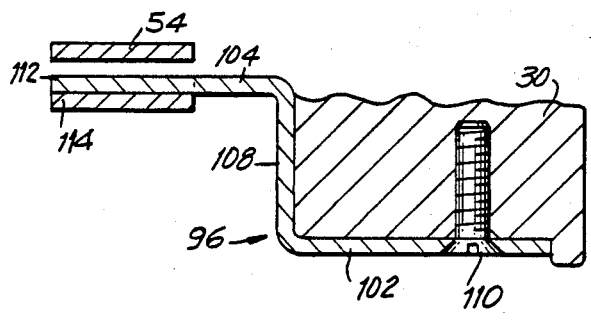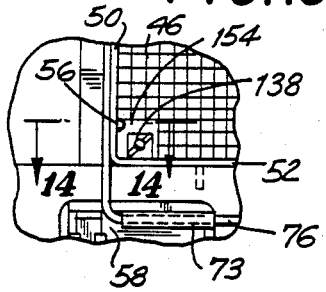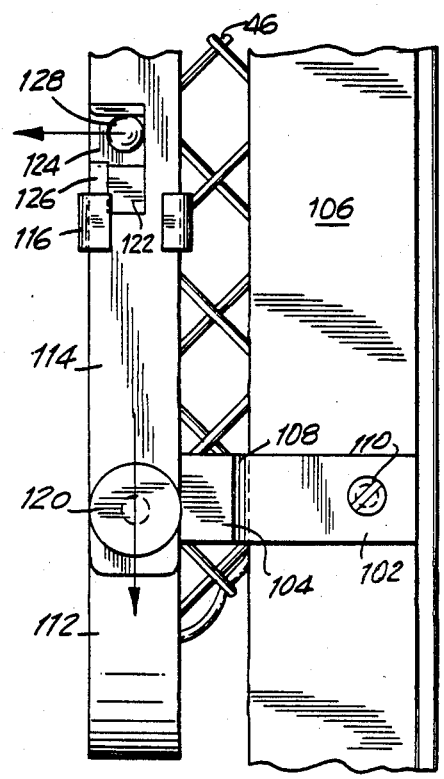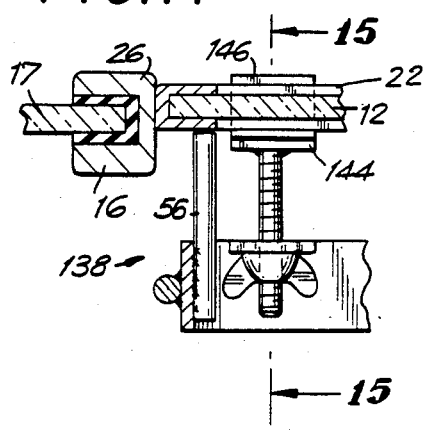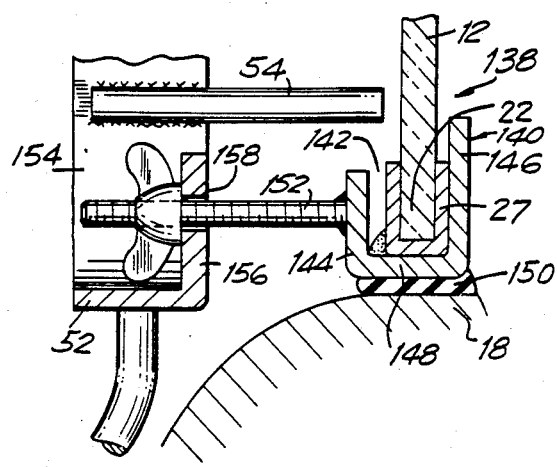

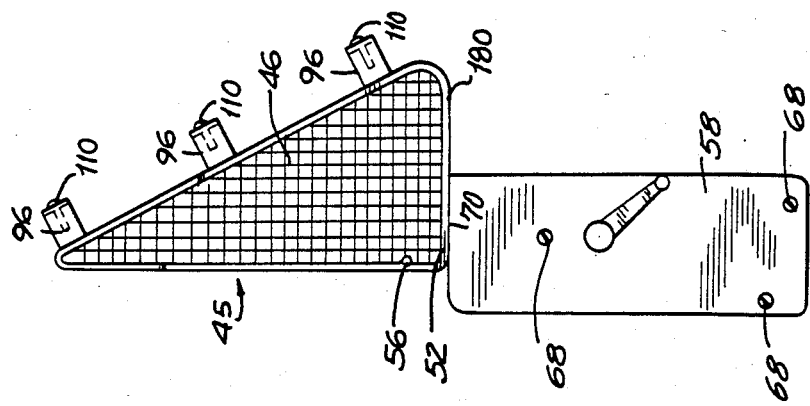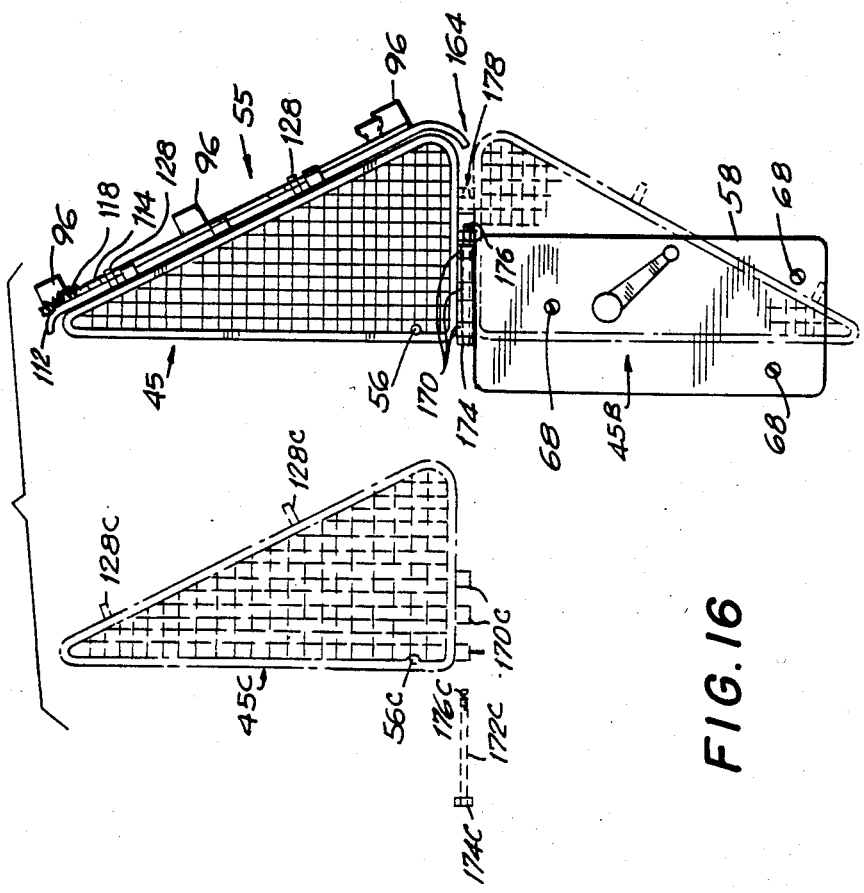

PROTECTIVE SYSTEM FOR VAN AND TRUCK VENT WINDOWS

BACKGROUND OF THE INVENTION

This application relates generally to devices for preventing a thief from entering a motor vehicle, particularly a van or truck, through the vent window.

Most vans and trucks have vent windows which are locked only by a latch pivoted to the vent window and capable of being levered against the frame of the vent window. Although vehicles have conventional barrel locks that discourage or inhibit thieves, vent windows are left comparatively unprotected against even non-professional thieves. The method of entry is simply to insert a screwdriver, a knife, or other similar flat tool under the bottom of the vent window, work the tool through to the interior of the vehicle, and then lift the free end of the latch so as to rotate it back to its vertical, or unlocked position. This action can be accomplished in three or four seconds even by amateur thieves. Once the vent window is unlocked, the window can be swung open thus making the door handle or window regulator handle accessible to the thief. It can be said that latch locks have been found to be totally inadequate to securing a vent window. Many vent latch locks are provided with push-button released devices, but these serve only to slow down an experienced thief for a few seconds.

There have been a number of devices invented that are intended to alleviate the inadequacy of vent window latch locks. Once a thief encounters a device that acts to slow up his efforts to gain entry, he often simply resorts to smashing the vent window since this will give him access to the latch lock which he can then rotate to completely open the vent window. The direct method of placing a protective steel screen, or mesh, over the vent window and welding or bolting the mesh to the window frame of the front door has several disadvantages. One is that the welding or bolting process must be done by a skilled technician with a resulting high installation cost. A second is that once a mesh is welded or bolted to a vent window, future use of the window is for practical purposes prevented. Yet another disadvantage is that the owner can remove the welded mesh only at the undesirable result of permanently damaging the vehicle.

Prior art devices in this field include U.S. Pat. No. 3,722,935 issued to Latib on Mar. 27, 1973 and entitled "Locking Devices for Vehicle Vent Windows," which discloses a housing having a lip adapted to be received in the groove of the vertical rearward frame of the vent window and means for removably locking the housing to the frame. The Latib device does not provide a mesh cover for the vent window. Once the vent window is broken, the device can easily be defeated in a similar manner to defeating the latch lock. Thus, its principle advantage of disallowing screwdriver insertion and manipulation of the lock is easily overcome by direct action of a thief.

Another device is described in U.S. Pat. No. 4,268,071 issued May 19, 1981 to Hibbert and entitled "Window Lever Lock." Here, a vent window locking lever is locked into its locking mode by the device of the invention. A swing member provided with a U-shaped member connected to a hook can be swung down and screwed into a base member after the vent window locking lever has been engaged by the hook in the locking mode. Again, this device can be defeated by the simple maneuver of smashing the vent window. There would be some pause in time until the locking screw of the device was unscrewed.

Finally, the applicant herein presently has a locking device for vent windows on application on file entitled, Vent Window Securing Device for Vans & Trucks, application Ser. No. 06/663,661, filed 10/19/84.

SUMMARY OF THE INVENTION

Accordingly, it is an object of the present invention to provide a protective system for the vent windows of a motor vehicle that is easily mounted and is capable of covering the entire vent window and also locks the vent window latch into its locked mode.

It is another object of the present invention to provide a protective system for the vent windows of a motor vehicle that can be installed without welding and can be easily removed without damage to the vehicle.

It is yet another object of the present invention to provide a protective system for the vent windows of a motor vehicle that does not block view through the window and that prevents the locking latch of the vent window from being rotated to an open position.

It is a further object of the present invention to provide a protective system for the vent windows of a motor vehicle that can be seen through, that blocks the rotation of the locking latch of the vent window, and that can be temporarily removed for the locking mode so as to allow the passenger or driver to open the vent.

It is yet another object of the present invention to provide a protective system for the vent windows of a motor vehicle that can be installed or removed from the vehicle without alteration to the vehicle.

It is yet another object of this invention to provide a novel way of installing a protective system for a vent window that can be installed without welding, drilling, or riveting.

It is yet another object of this invention to provide a protective system for vent windows that can be easily moved from an unlocked to a locked mode and then easily moved back to the unlocked mode to allow the vent window to be open while the vehicle is in motion.

It is also another object of the present invention to provide a protective system for vent windows that is adapted to secure the vent window when the vent window latch is missing.

A short exposition of the structure of the door area of a motor vehicle will be made so as to clarify the mounting method of my invention. The frame of a typical van or truck has several frame screws that are installed by the manufacturer in the window frame of the main door frame immediately forward of the vent window to secure the vent window frame. These screws are located slightly above the front angled side of the vent window frame at the top of the door frame. These door screws are easily removable and are used to mount one portion of the present invention, thus avoiding the need to drill new screw holes in the door frame.

In addition, several screws are installed in the door frame by the manufacturer for the support of the hand-operated window regulator plate. These regulator support screws are also used to support a portion of my protective system. Again, new screw holes need not be drilled in order to mount the protective device.

The protective system for van and truck vent windows includes a metal mesh member positioned inside the motor vehicle lateral to the vent window so as to prevent access to the inside of the vehicle and to provide visual access through the vent window for the operator of the vehicle. A flat connector plate is fastened to the inside of the front door by way of the hand-operated window regulator plate screws. The mesh member is connected to the top edge of the plate. A mounting device is connected to the front door just forward of the angular front edge of the mesh frame by way of the pre-existing vent window frame screws. A pin connected to the mesh member extends transversely towards the vent window at a position that intercepts the lateral rotational movement of the vent window latch from its locked mode to its unlocked mode so as to keep the vent window in its closed mode.

In the preferred embodiments, a horizontal hinge device is positioned between the connector plate and the mesh member. In one embodiment a horizontal hinge mount connected to or integral with the top portion of the connector plate forms a horizontal channel; and a hinge pin rotatably positioned in the channel is connected at its rearward end by way of a vertical connector to the bottom edge of the frame of the mesh member. The mesh member is thus rotatably movable about the hinge device between an upright operative position adjacent to the vent window to a downward inoperative position lateral to the connector plate. The hinge device is releasably secured so as to prevent forward or backward movements of the mesh member. In this embodiment the mesh frame is prevented from moving forward relative to the vehicle by a forward mounting apparatus that includes a plurality of double right angle flanges that are screwed to the door frame by pre-existing vent window frame screws. The forward mounting apparatus includes a pair of elongated mounting bars welded to the flanges. The mounting bars are spaced from the door frame by the flanges and are disposed adjacent to the angular forward edge of the mesh frame at the same angle as the frame forward edge so that the mesh member is prevented from forward movement. The mesh member can be released from its engagement with the pair of mounting bars for transverse movement relative to the vehicle about the hinge device. A pair of connector pins connected to the angular forward edge of the mesh frame extend lateral to the vent windows perpendicular to the mesh frame into a pair of cooperating slots formed in the pair of mounting bars. One of the mounting bars is stationary being welded to the right angle flanges; the other mounting bar is slidable relative to the longitudinal dimension of the stationary bar. In one position the two bars lock the mesh member pins into non-transverse movement. In a second postion when the slidable bar has been pulled down, the slots become unblocked and the mesh frame pins are free to be moved along with the mesh member transversely from engagement with the forward mounting apparatus so that the mesh member can be rotated about the hinge device. An expansion spring connected to the top portions of the stationary and sliding bars is drawn into a biased mode when the sliding bar is pulled downwards and acts to pull the sliding bar upwards once the sliding bar is released.

The mesh member, the connector plate, and the forward mounting apparatus can alternatively be welded together into an integral unit that can be screwed to the door by pre-existing vent window frame screws and window regulator frame screws.

The present invention will be better understood and the objects and important features, other than those specifically enumerated above, will become apparent when consideration is given to the following details and description, which when taken in conjunction with the annexed drawings, describes, discloses, illustrates, and shows preferred embodiments of the present invention and what is presently considered to be the best mode of position in the principle thereof. Other embodiments or modifications may be suggested to those having the benefit of the teachings herein. Such other embodiments or modifications are intended to be reserved especially as they fall within the scope and spirit of the subjoined claims.

BRIEF DESCRIPTIONS OF THE DRAWINGS

FIG. 1 is a side elevational view of the protective system from the inside of the vehicle;

FIG. 1A is a side elevational view of the vent window environment of the present invention;

FIG. 2 is a view taken through line 2—2 of FIG. 1;

FIG. 3 is a view taken through line 3—3 of FIG. 1;

FIG. 4 is a view taken through line 4—4 of FIG. 1;

FIG. 5 is a view taken through line 5—5 of FIG. 1;

FIG. 6 is a fragmented view taken through line 6—6 of FIG. 1;

FIG. 7 is a view taken through line 7—7 of FIG. 1;

FIG. 8 is a view taken through line 8—8 of FIG. 6;

FIG. 9 is a view taken through line 9—9 of FIG. 6;

FIG. 10 is a view taken through line 10—10 of FIG. 6;

FIG. 11 is a view taken through line 11—11 of FIG. 6;

FIG. 12 is a fragment side view of the slidable mounting bar;

FIG. 13 is a detailed side view of the backup clamp member;

FIG. 14 is a view taken through line 14—14 of FIG. 13;

FIG. 15 is a view taken through line 15—15 of FIG. 14;

FIG. 16 is a side elevational view of another embodiment of the protective system; and FIG. 17 is a side elevational view of another embodiment of the protective system.

DESCRIPTION OF THE PREFERRED EMBODIMENTS

Reference is now made in detail to the drawings in which identical or similar parts are designated by the same reference numerals throughout.

A mesh protective system 10 for providing security against entry to the inside of a motor vehicle is shown in FIG. 1. Before proceeding to a description of the invention, a brief description of the environment of the protective system will first be set forth, with added reference to FIG. 1A.

A vent window 12 is mounted in a vent window frame 14 immediately forward of the front vertical front frame portion 16 of the main window frame for the main window 17 of the front door 18 of a motor vehicle. Vent window 12 has a vertical rear side 20, a horizontal bottom side 22, and an angular front side 24 joined to the top end of the rear side and the front end of the bottom side so as to form a right-angled triangle. A mounting trim 27 extends around the edges of vent window 12. Vent window frame 14 includes a vertical rear portion, or edge, that is integral with front frame portion 16 of main window 17 and will be indicated as such by the same numeral 16; a horizontal bottom portion, or edge, 28, and an angular front edge 30 generally aligned or contoured with the respective rear, bottom, and front sides 20, 22, and 24 of vent window 12. Angular front edge 30 is aligned with and connected to the angular door flange 32 of front door 18. Vent window 12 is rotatably secured to upper and lower vertically aligned pivots 34 and 36 respectively which are in turn connected to front edge 30 and bottom edge 28 respectively, so that window frame 12 is movable about a vertical axis between open and closed positions, the latter as shown in FIG. 1. A vent window latch 38, seen best in FIGS. 3 and 3A, is rotatably secured to vent window 12 at trim 27 at rear edge 26 proximate to bottom edge 28. Latch 38 is movable about a horizontal axis, or pivot, 40 transverse to the vehicle in a vertical plane lateral to the vehicle between locked and unlocked positions. Latch 38 includes an arm 42 movable about pivot 40 at one end and having an opposed free end having a wedge portion 44 capable of being jammed against window frame 16 when the latch is in its locked position. Latch 38 is in its unlocked position when wedge portion 44 is rotated away from window frame 16 and vent window 12 is capable of being rotated to its open position. Because protective system 10 is illustrated as mounted throughout the figures and vent window 12 cannot be rotated to its open position, the open position is not illustrated. The open position wherein air can be passed into the vehicle is well-known.

Protective system 10 is mounted in the environment described and includes a metal mesh member 45 that in turn includes screen member, or mesh face, 46 and a mesh frame enclosing mesh face 46. The mesh frame comprises a continuous vertical rear edge 50, a horizontal bottom edge 52, and an angular front edge 54 joined to the rear and bottom edges. Edges 50, 52, and 54 are contoured generally along and spaced proximate to rear, bottom and front sides 20, 22, and 24 respectively of vent window 12. Mesh face 46 is positioned lateral to vent window 12. Mesh frame 48 is preferably a continuous flat member the flat side of which is generally lateral to vent window 12 and the vehicle itself. Mesh face 46, which is preferably configured as thin vertical and horizontal metal bars, is secured to the inner edge of mesh frame 48 relative to the vehicle. Mesh member 45 is positioned inside the vehicle proximate and generally lateral to vent window 12 and is capable of preventing access to the inside of the vehicle and is further capable of providing visual access for the driver of the vehicle through vent window 12.

As seen in FIGS. 1, 2, 3, and 3A, a metal latch blocking pin 56 is connected to and extends transversely from rear edge 50 of mesh member 45 towards vent window 14. Blocking pin 56 is preferably welded to the inner flat side of rear edge 50. The remaining portion of blocking pin 56 is free and is disposed across the vertical plane of movement of vent window latch 38 so as to prevent latch 38 from being moved from its locked position wherein wedge 44 is pressed against the inner side of frame portion 16 in the vertical plane mentioned to a generally vertical disposition (not shown) wherein latch 38 is in its unlocked position and vent window 12 can be pushed to its open position. Latch 38 is shown in FIG. 3A having been rotated in its vertical plane of movement to a position indicated as 38A in phantom lines yet with wedge 44 still in pressing association with frame 16 and hence with latch 38 still in its locked mode.

Mesh member 45 is secured to door 18 by two securing mechanisms, namely, by a forward mounting apparatus 55 positioned adjacent to angular front edge 54 of the mesh frame that will be explained in detail later; and by a plate member 58, to be explained immediately as follows.

Before discussing plate member 58, the environment of the area of door 18 where plate member 58 is attached is first set forth. A hand-operated window regulator 60 that operates window regulator arm 62 that in turn transmits force for the raising and lowering of main window 17 is shown in FIG. 1. Window regulator 60 is connected to window regulator handle 64. Window regulator 60 is mounted to door 17 by a window regulator plate 66 via three appropriately located window regulator frame screws 68. The number and positions of screws 68 are slightly different for different manufacturers of trucks, but these frames and screws and doors generally do not vary over a period of years for each manufacturer.

Plate member 58 forms three screw holes at intervals aligned with and adapted to receive screws 68. Plate member 58 is securely and removably mounted to door 18 at window regulator frame 66 by pre-existing screws 68. Plate member 58 is generally rectangular set flat against door 18. As seen best in FIG. 2, plate member 58 has a generally horizontal upper edge 70 that extends generally parallel to and is spaced below horizontal bottom edge 28 of the mesh frame of mesh member 45. Plate member 58 forms a circular hole 71 for passing the pivot of window regulator handle 64.

The embodiment being described as relating to FIGS. 1–15 is capable of temporarily freeing mesh member 45 when, for example, the driver wishes to open vent window 12. Before describing forward mounting apparatus 55 at angular front edge 54, a rotating arrangement between mesh member 45 and plate member 58 will first be described.

A hinge device 72 mounted to horizontal bottom edge 52 of mesh member 45 and horizontal upper edge 70 of plate member 58 is capable of allowing rotational movement of mesh member 45 about a generally horizontal axis between an operative position and an inoperative position. In the operative position mesh member 45 is positioned with mesh face 46 spaced proximate to vent window 12 as seen in FIGS. 1 and 2. In the inoperative position mesh member 45 has been rotated away from vent window 12 and latch blocking pin 56 has been removed from its interfering position relative latch 38, with mesh face 46 generally lateral to plate member 58. The general rotational movement of mesh member 45 from the operative to the inoperative position about hinge device 72 is shown in successive stages in FIG. 2 and indicated in the operative mode as mesh member 45 and mesh face 46; shown in an intermediate position and indicated as mesh member 45A and mesh face 46A; and shown in the final inoperative position and indicated as mesh member 45B and mesh face 46B.

Hinge device 72 includes plate member 58 having a hinge joint 73 forming a horizontal, elongated, cylindrical slot 74 at upper edge 70. A cylindrical hinge pin 72 rotatably positioned in slot 74 lateral to door 18 has opposed rear and front ends relative to said vehicle. A vertical connecting member 78, shown in the figures being cylindrical and integral with hinge pin 76, is connected to the rear end of hinge pin 76 at the lower end of connecting member 78 and to bottom edge 52 of the mesh frame at vertical rear edge 50. As seen in FIG. 2, connecting member 78 is angled in cross-sectional profile relative to the length of the vehicle so as to follow the contour of door 18 between the plate member and the mesh member. In the embodiment illustrated, connecting member 78 extends upwardly to a stiffening member 79 integral with connecting member 78 for welded connection to rear edge 50 of the mesh frame.

Hinge pin 76 is locked into slot 74, that is, is prevented from rearward and forward motion relative to plate member 58. Forward motion is prevented by a rear portion 80 of hinge joint 73 located immediately forward of connecting member 78 at the rear end of hinge pin 76. Rearward motion is prevented by a stop member 82 mounted to the top end of an elongated, flat, slide member 84 vertically disposed and having an opposed bottom end having a hand grip 86. A vertical guide member 88 connected to plate member 58 is adapted to slidably restrain slide member 84. As seen best in FIG. 4, guide member 88 includes a pair of parallel vertical track members 90 and 92 forming a pair of spaced vertical grooves defined in part by plate member 58 adapted to slidingly receive and capture the opposed vertical sides of slide member 84. Slide member 84 is capable of being moved vertically between locked and unlocked positions, wherein in the locked position stop member 82 is positioned at the rear end of hinge pin 76 wherein hinge pin 76 is prevented from moving rearwardly relative to said vehicle and hinge joint 73; and wherein in the unlocked position stop member 82 is spaced vertically downwardly from the locked position so as to allow hinge pin 76 to be moved rearwardly relative to hinge joint 73 along with mesh member 45. A bottom block 94 is connected to plate member 58 at the point of maximum desired downward travel of the bottom end of slide member 84 so as to prevent further downward movement. In FIG. 2, the locked position of stop member 82, slide member 84, and hand grip 86 are shown in solid lines; and the unlocked position is shown in phantom lines with the stop member indicated as 82A, the slide member as 84A, and the hand grip as 86A.

Attention is now directed to the second securing mechanism for connecting mesh member 58 to door 18, namely, forward mounting apparatus 55. Forward mounting apparatus 55 is adapted to prevent forward movement of mesh member 58. In addition, transverse movement of mesh member 58 about hinge 72 is prevented by apparatus 55, which, however, is capable of releasing the mesh member for rotational movement about the hinge. Forward mounting apparatus 55 includes three equally spaced, double right angle members 96 seen in FIGS. 6-12 having paired opposed first and second securing portions 102 and 104, respectively, extending transverse to mesh member 45. First securing portions 102 are secured to angular front edge 106 of door 18 adjacent to angular front edge 30 of vent window frame 14. Middle connecting portions 108 connected to and integral with first and second securing portions 102 and 104 extend lateral to mesh member 45. Three appropriately located pre-existing screws 110 are provided by the manufacturer to secure angular vent window frame 14 to angular front edge 106 of door 18. Screws 110 vary for each motor vehicle manufacturer but generally do not vary over a period of years. Screws 110 are received by screw holes formed in first securing portions 102 so as to securely and removably mount double right angle members 96 to door 18.

Second securing portions 104, which are disposed rearwardly of first securing portions 102, are connected to an elongated, flat stationary mounting bar 112. A second elongated flat mounting, or slide, bar 114 generally coextensive with first mounting bar 112 is slidably secured to the forward side of mounting bar 112 by three spaced loops, or brackets, 116 that are connected to the sides of mounting bar 112 and curl around and partly over the forward side of slide bar 114 so that slide bar 114 is slidable along the elongated dimension of stationary bar 112 along the forward side of stationary bar 112. Stationary bar 112 has opposed upper and lower ends; one end of an expansion spring 118 is connected to the upper end by screw 119. Slide bar 114 likewise has opposed upper and lower ends each spaced inwardly relative to the ends of mounting bar 112. The upper end of slide bar 114 is connected to the other end of expansion spring 118 by screw 121. The lower end of slide bar 112 is provided with a handle 120. Expansion spring 118 is shown in its unbiased mode in FIG. 6.

Mounting bar 112 forms two spaced first recesses 122 transverse to mesh member 45 and to the vehicle generally and having rearward sides open towards mesh member 45. Slide member 114 forms two second recesses 124 transverse to mesh member 45 and to the vehicle and having rearward sides partly open and partly defined by blocking fingers 126 that extend upwardly from the bottom sides of the recesses. Slide bar 114 is movable between locked and unlocked positions. Two equally spaced pin members 128 are connected to and extend generally perpendicular to and forwardly from angular front edge 54 of the mesh frame of mesh member 45. When slide bar 114 is in its locked position, first and second recesses 122 and 124 are in cooperative alignment, blocking fingers 126 extend across the open rearward sides of first recesses 122, and expansion spring 118 is in its unbiased mode as seen in FIG. 6; pin members 128 extend transversely through both the first and second recesses with the pin members prevented from moving transversely inwardly relative to vent member 12 and the vehicle generally by blocking fingers 126 of slide member 114. When slide bar 114 is in its unlocked position, as seen in fragmented view in FIG. 12, slide bar 114 has been slid downwardly by the operator by pulling handle 120, second recesses 124 are slid away from alignments with first recesses 122 as described above to partially coextensive alignments with blocking fingers 126 in particular slid away from their blocking positions relative to the open rearward sides of first recesses 122, so that pin members 128 can be moved transversely inwardly relative to vent window 12 and the vehicle generally. In the unlocked position, expansion spring 118 extended from its unbiased mode to a biased mode (not shown) so that when the operator releases handle 120, slide member 114 is pulled back to its first position as expansion spring 118 returns to its unbiased mode.

In sequence, the operator pulls handle 120 down along with slide bar 114 to its second position and thereupon rotates mesh member 45 away from vent window 12 around hinge device 72 from its operative position proximate to vent window 12 to its inoperative position away from vent window 12 and in particular generally lateral to plate member 58. The operator, after moving pin members 128 from their captured positions in recesses 122 and 124, releases handle 120 and slide member 114 is snapped, or drawn, back to its first position by biasing action of expansion spring 118. In reverse sequence, the operator rotates mesh member 45 from its inoperative position towards its operative position lateral to vent window 12 and simultaneously pulls slide member 114 downwardly from its first position to its second position, slides pin members 128 into first recesses 122 and then releases slide member 114 for biased movement back to its first position with blocking fingers 126 of slide member 114 moving to block the rearward open sides of first recesses 122 and thus lock mesh member 45 into its operative position.

Mounting bar 112 is extended at its upper and lower portions 130 and 132 respectively seen in FIGS. 1 and 6. Upper portion 130 bends approximately at right angles from the main extension of mounting bar 112 rearwardly transverse to vent window 12. As seen in FIGS. 1 and 2 and best in FIGS. 7 and 8, cylindrical connecting member 78 is connected initially to horizontal bottom edge 52 of the frame of mesh member 45. A cylindrical extension member 134 integral with connecting member 78 extends upwardly along and is connected, preferably by welding, to vertical rear edge 50 of the mesh frame. The upper end of extension member 134 is disposed past upper portion 130 of mounting bar 112. Upper portion 130 forms a recess 136 having an open inward side adapted to receive the upper end of extension member 130 so that extension member 134 is blocked from rearward movement by upper portion 130 at the rear edge of recess 136. Thus, efforts by anyone trying to loosen mesh member 45 by moving its upper end horizontally away from mounting bar 112 would be hindered. Lower portion 132 is preferably curved inwardly in a general configuration with the lower juncture of bottom and front edges 52 and 54 so as to present a hinderance to downward forcing movement of mesh member 45.

Mesh member 45 can, if so desired, be completely removed from the area of vent window 12 after slide bar 114 has been slid down to its lowered position and mesh member 45 has been rotated from its captured relationship with forward mounting apparatus 55. When vertical slide member 84 is pulled down so as to remove stop member 82 from its blocking position relative to hinge pin 76, the hinge pin is freed for rearward sliding movement out of channel 74 as shown in FIG. 1 and indicated as hinge member 45C, with the mesh frame edges indicated as 50C, 52C, and 54C. For purposes of exposition mesh member 45C is shown in a vertical position, when it is easier to slide mesh member rearwardly when the mesh member has been rotated out of its relationship with forward mounting apparatus 55. In fact, however, mesh member 45 can be pulled horizontally from its relationship with forward mounting apparatus 55 since recesses 122 and 124 are large enough to allow horizontal movement of pin members 128 without movement of slide bar 114 for transverse release of the pin members.

FIG. 1 indicates, and FIGS. 13, 14, and 15 show in detail a backup clamp apparatus 138 that can be used when vent window latch 38 is broken. Clamp apparatus 138 includes a U-bracket 140 forming a channel having an open top side with the channel disposed so as to receive horizontal bottom side 22 of vent window frame 14. Bracket 140 has opposed inner and outer walls 144 and 146 respectively relative to vent window 12 and a bottom wall 148 atop rubber cushion 150. A horizontal screw 152 affixed to inner wall 144 of bracket 140 extends transversely inwardly relative to the vehicle and vent window 12 through an aperture 154 formed in mesh face 46 at the area of juncture of rear and bottom edges 50 and 52 of the mesh frame. A support flange 156 coextensively positioned with inner wall 144 generally lateral to vent window 12 is secured to bottom edge 52 preferably at the inner edge of bottom edge 52. Support flange 156 forms a hole 158 adapted to pass screw 152 so that the end portion of the screw extends inwardly from mesh face 46. A nut 160, preferably a winged nut as shown in the figures, is screwed onto screw 152 at the inward side of support flange 156 with the nut screwed tightly against the inner surface of the flange so that inner wall 144 is drawn against support flange 156 and outer wall 146 of U-bracket 140 tends to pull vent window 12 tightly inwardly and to keep the vent window locked into its closed position. Thus, mesh member 45 can be held into its operative position with latch 38 broken. Backup clamp apparatus 138 can be used in conjunction with an unbroken latch 38 as added protection.

FIG. 16 illustrates an alternate hinge device 164 to hinge device 72 described previously. Upper and lower flat hinge mounts 166 and 168 are connected to horizontal bottom edge 52 of mesh member 45 and horizontal upper edge 70 of plate member 58 respectively. Upper and lower hinge mounts 166 and 168 each preferably have three spaced interlocking portions that form a continuous horizontal cylindrical channel 170 adapted to rotatably receive hinge pin 172, which is provided with a head 174 at its rearward end relative to the vehicle and a threaded end 176 at its forward end. A nut and washer 178 are screwed onto threaded end 176. Head 174 prevents pin 172 from being drawn past hinge mounts 166 and 168 when nut and washer 178 are screwed onto the forward end of pin 172. Mesh member 45 is capable of being rotated about hinge 164 upon release of frame pins 128 upon operation of slide member 114 as described previously in relation to FIGS. 1–15 so that it is lateral to plate member 58 as shown in phantom lines in FIG. 16 and indicated as mesh member 45B, similar to the position shown in the embodiments portrayed in FIGS. 1 and 2. In addition, nut and washer 178 can be unscrewed from pin 172 so that pin 172 can be removed from channel 170 as shown in phantom lines in FIG. 16 and indicated as nut and bolt 178C, while pin member 172 can likewise be withdrawn as shown in phantom lines and indicated as pin member 172C. Three portions of channel 170 are indicated as channel portions 170C. Mesh member 45 can also be withdrawn as shown in phantom lines and indicated as mesh member 45C.

FIG. 17 indicates a simplified embodiment of the invention shown as mesh protective system 18. Mesh member 45 is welded to plate member 58 along horizontal bottom edge 52 of the mesh member and horizontal upper edge 70 of the plate member. Double right angle connecting members 96 are welded directly to angular front edge 54 of the mesh frame. Connecting members 96 are screwed to the door by vent frame screws 110 and plate member 58 is screwed to the door by window regulator plate screws 68. In this embodiment latch blocking pin 56 is located as described with regard to FIGS. 1–15. Mesh face 46 covers the entire area enclosed by mesh frame 182. Mesh protective system 180 can be secured to the door in one unit by screws 110 and 68; and likewise, system 180 can be removed from the door by removal of screws 110 and 68, followed by replacement of the screws sans protective system 110.

The embodiments of the invention described above have presumed a vent window latch that latches against the vertical frame portion 16. It is, of course, possible to adjust the position of latch blocking pin 56 to block the movement of a vent window latch that latches against horizontal bottom edge 28 of vent window frame 14 within the scope of art utilizing the inventive aspects of the embodiments described above.

The embodiments of the invention particularly disclosed and described hereinabove are presented merely as examples of the invention. Other embodiments, forms, and modifications of the invention coming within the proper scope and spirit of the appended claims will, of course, readily suggest themselves to those skilled in the art.

What is claimed is:

1. A protective system for a vent window on the front door of a motor vehicle rotatably secured to a vent window frame and movable about a vertical axis between open and closed positions, the vent window being held in the closed position by a vent window latch rotatably secured to the vent window about a horizontal axis transverse to the vehicle in a vertical plane lateral to the vehicle between locked and unlocked positions, wherein in the locked position the latch is wedged against the vent window frame and in the unlocked position the latch is free of the vent window frame, comprising, in combination:

mesh means positioned inside said vehicle proximate and lateral to said vent window for preventing access to the inside of said vehicle and for providing visual access through said vent window for the driver of said vehicle, first mounting means positioned below said mesh means for securing said mesh means to the inside of said door, second mounting means positioned forward of said mesh means for securing said mesh means to said door at said vent window frame, and preventing said mesh means from being moved either forwardly or laterally relative to said vehicle, and latch blocking means connected to said mesh means for preventing said vent window latch from being moved from said locked position to said unlocked position.

2. A system according to claim 1, wherein said vent window has a vertical rear side, a horizontal bottom side, and an angular front side joined to the rear and bottom sides, said mesh means including a mesh face and a mesh frame enclosing said mesh face, said mesh frame including a vertical rear edge, a horizontal bottom edge, and an angular front edge joined to said rear and bottom edges, said rear, bottom, and front edges being contoured generally along and spaced proximate to said rear, bottom, and front sides respectively of said vent window, said mesh face being positioned lateral to said vent window.

3. A system according to claim 2, wherein said first mounting means includes a plate member connected to said door below said vent window, said plate member having a generally horizontal upper edge connected to said horizontal bottom edge of said mesh frame.

4. A system according to claim 3, further including a hand-operated window regulator controlling a main window secured to said front door by a window regulator plate by a plurality of pre-existing window regulator screws, said plate member forming a plurality of screw holes at intervals aligned with and adapted to receive said plurality of window regulator screws, said plate member being secured to said door at said window regulator frame by said window regulator frame screws.

5. A system according to claim 4, wherein said latch blocking means includes a blocking pin connected to and extending transversely outwardly from said vertical rear edge of said mesh frame towards said vent window, said vent window latch including an arm pivoted at one end to said vent window and a free end having a wedge portion capable of being jammed against said vent window frame when said latch is in said locked position, said arm being rotatably movable laterally relative to said vent window, said blocking pin being adapted to block the movement of said arm from said locked position to said open position.

6. A system according to claim 5, wherein said second mounting means includes a plurality of double right angle connecting flanges having first and second opposed securing portions extending transversely from said door to said mesh member, said first securing portions being secured to said door at said angular front edge of said vent window frame, and said second securing portions being spaced inwardly from said first securing portions and connected to said angular front edge of said mesh frame.

7. A system according to claim 6, wherein said vent window frame is secured to said front door by a plurality of pre-existing vent window frame screws, said plurality of double right angle connecting members being positioned at intervals corresponding to said plurality of vent window frame screws, said first portions of said double right angle connecting members forming screw holes adapted to receive said vent window frame screws, said double right angle connecting members being connected to said door frame at said vent window frame by said plurality of vent window screws.

8. A system according to claim 7, further including means for temporarily rotating said mesh member from an operative position proximate to said vent window and an inoperative position removed from said vent window generally lateral to said plate member, said means for temporarily rotating being cooperatively associated with said horizontal bottom edge and said angular front edge of said mesh frame.

9. A system according to claim 8, wherein said means for temporarily rotating includes a plurality of equally spaced pin members connected to and extending generally perpendicular to and forwardly from said angular front edge of said mesh frame, said means for temporarily rotating further including first and second generally coextensively mounting bars, said first mounting bar being connected to said second portions of said right angle connecting members, said second mounting bar being slidably secured to the forward side of said first mounting bar, said first mounting bar having opposed upper and lower ends; biasing means connected to said upper end of said first mounting bar; said second mounting bar having opposed top and bottom ends, said top end being biasedly connected to said biasing means; a handle connected to said bottom end; said first mounting bar forming a plurality of first recesses transverse to said mesh member and having open rearward sides; said second mounting bar forming a plurality of second recesses transverse to said mesh member and having rearward sides partly open and partially blocking fingers; said second bar being movable along the longitudinal dimension of said first bar between locked and unlocked positions, wherein in said locked position said first and second recesses are in cooperative alignment and said plurality of pin members of said mesh frame extend transversely through said first and second recesses, said blocking fingers extend across said open rearward sides of said first recesses and said pin members are prevented from moving transversely inwardly relative to said vent windows by said blocking fingers of said second mounting bar and said biasing means is in an unbiased mode; and wherein in said unlocked position said blocking fingers of said second mounting members are slid away from their blocking positions relative to said open rearward sides of said first recesses, so that said pin members can be moved transversely inwardly relative to said vent window and said biasing means is in a biased mode.

10. A system according to claim 9, wherein said plate member includes a generally horizontal upper edge generally parallel to said horizontal bottom edge of said mesh member, and wherein said means for temporarily rotating further includes hinge means connected to said upper edge of said plate member and to said bottom edge of said mesh member, said hinge means being for rotating said hinge member about a generally horizontal axis between said operative and inoperative positions after movement of said second mounting bar to said unlocked position.

11. A system according to claim 10, wherein said hinge means includes first and second hinge mounts connected to said horizontal bottom edge of said mesh member and to said plate member at said horizontal upper edge respectively and respectively forming first and second cylindrical slot segments capable of being coextensively aligned into a single generally horizontal cylindric slot; a hinge pin capable of being positioned in said single slot; and pin locking means for removably keeping said hinge pin in said single slot, wherein said mesh member can be rotatably moved about said hinge pin between said operative and inoperative positions.

12. A system according to claim 11, wherein said pin locking means includes said hinge pin having opposed ends, a head being positioned at an end and threads being formed at the opposite end; and a nut adapted to be screwed onto said threads at said opposite end, whereby said hinge pin is prevented from being moved forwardly by said head being positioned against one of said hinge members and rearwardly by said nut being positioned against the other of said hinge members.

13. A system according to claim 10, wherein said hinge means includes said plate member having a hinge joint at said upper edge forming a generally horizontal elongated cylindrical slot; a generally horizontal hinge pin rotatably positioned in said slot, a connecting member connected to said bottom edge of said mesh member generally at said rear vertical edge of said mesh member, said hinge pin having opposed rear and front ends, said connecting member being further connected to said hinge pin at said rear end; and pin locking means for removable keeping said hinge pin in said elongated slot, wherein said mesh member is rotatably movable about said hinge pin between said operative and inoperative positions.

14. A system according to claim 13, wherein said pin locking means includes a vertical slide member having opposed top and bottom portions; a stop member and a hand grip connected to said top and bottom portions respectively; a vertical guide member connected to said plate member and having opposed vertical tracks spaced from said plate member capable of slidably guiding said slide member; said slide member being vertically movable between locked and unlocked positions; wherein in said locked position said stop member is positioned at said rear end of said hinge pin so that said hinge pin is prevented from being moved rearwardly, and wherein in said unlocked position said stop member is spaced vertically downwardly from said locked position so as to allow said hinge pin to be moved rearwardly from said hinge joint; and a bottom block connected to said plate member positioned below said bottom portion of said slide member wherein said bottom portion of said slide member is in blocking contact with said bottom block when said slide member is in said unblocked position; said pin locking means further including said hinge joint having a rear joint portion disposed immediately forward of said connecting member at said rear end of said hinge pin wherein said hinge pin is prevented from forward movement in said single slot.

15. A system according to claim 8, further including backup clamp means connected to said horizontal bottom edge of said mesh frame and removably securing said horizontal bottom side of said vent window frame for locking said vent window in said closed position.

16. A system according to claim 15, wherein said backup clamp means includes said mesh member forming an aperture in the area of said vent window latch; said bottom edge of said mesh frame having an outer edge relative to said vent window; a generally vertical flange piece connected to said outer edge of said bottom edge of said mesh frame at said aperture, said flange piece forming a transverse hole and having inner and outer surfaces relative to said vent window; a U-clamp member forming an upwardly open channel defined by a pair of spaced inner and outer vertical walls and a vertical bottom wall, said inner wall being coextensively positioned with said outer surface of said vertical flange piece; a transverse horizontal screw member having opposed inner and outer ends, said outer end being connected to said inner end being disposed inwardly of said mesh member; and a nut removably positioned at said inner surface of said vertical flange piece so as to pull said clamp member against said outer surface of said vertical flange piece, said bottom side of said vent window being positioned within said U-channel; whereby said vent window is locked into said closed position.

* * * * *